United States Patent

Meyer

[15] 3,680,272
[45] Aug. 1, 1972

[54] STRUCTURAL ASSEMBLY AND CLIP

[72] Inventor: Engelbert A. Meyer, Union Lake, Mich.

[73] Assignee: USM Corporation, Warren Division, Union Lake, Mich.

[22] Filed: April 15, 1970

[21] Appl. No.: 28,755

[52] U.S. Cl. .................. 52/717, 24/73 MF, 85/5
[51] Int. Cl. .................. F16b 21/06, F16b 21/09
[58] Field of Search ...................... 52/716–718; 24/73 HS, 73 MF; 85/5

[56] References Cited

UNITED STATES PATENTS

| | | | |
|---|---|---|---|
| 3,473,283 | 10/1969 | Meyer | 52/718 |
| 3,320,712 | 5/1967 | Rapata | 52/717 |
| 2,540,790 | 2/1951 | Kost | 52/718 |
| 2,297,887 | 10/1942 | Hall et al. | 52/718 |

FOREIGN PATENTS OR APPLICATIONS 323,832   1/1930   Great Britain ................... 24/73

Primary Examiner—Henry C. Sutherland
Attorney—Burton and Parker

[57] ABSTRACT

A structural assembly is disclosed wherein a resilient clip, having a base portion secured to a support without perforation thereof, has integral resilient arms having outwardly and downwardly extending flanges which bite into the walls of a recess in a structural member telescoped over the clip, and with a central boss in the recess telescoped into an upwardly opening pocket defined by the arms and preventing lateral movement of the structural member which would dislodge the bite of the flanges in the walls of the recess.

6 Claims, 11 Drawing Figures

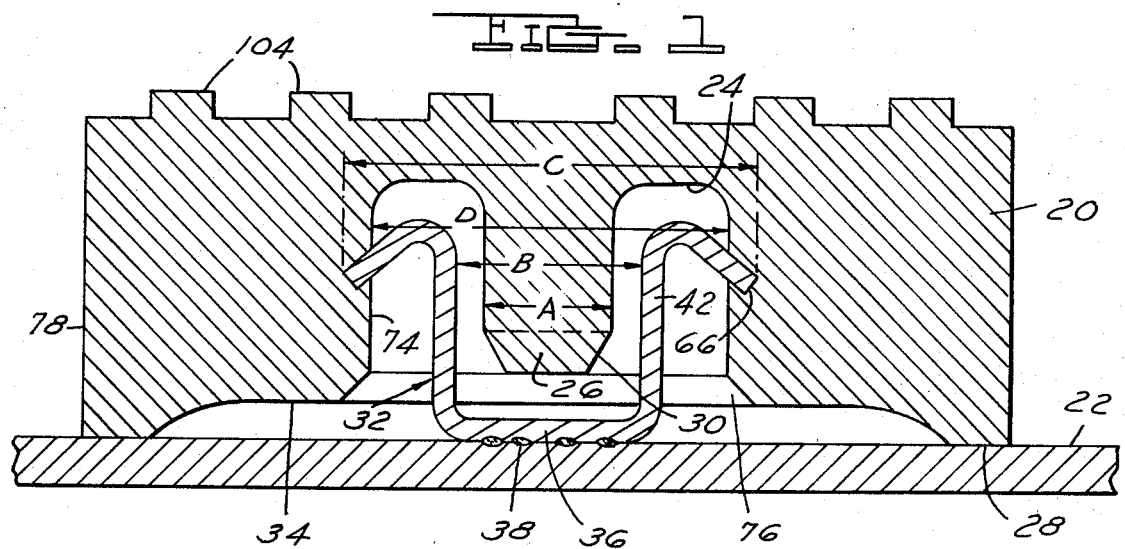
FIG. 1
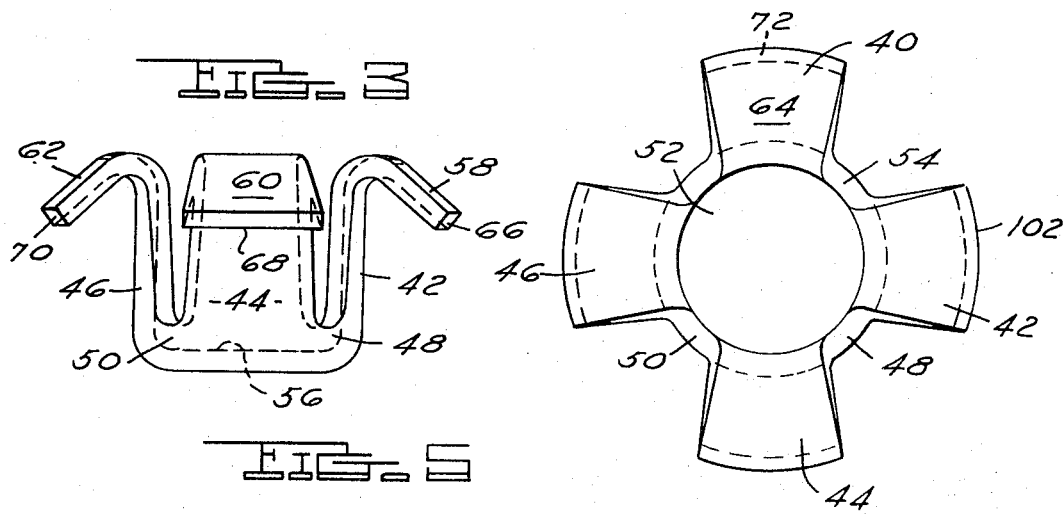
FIG. 3
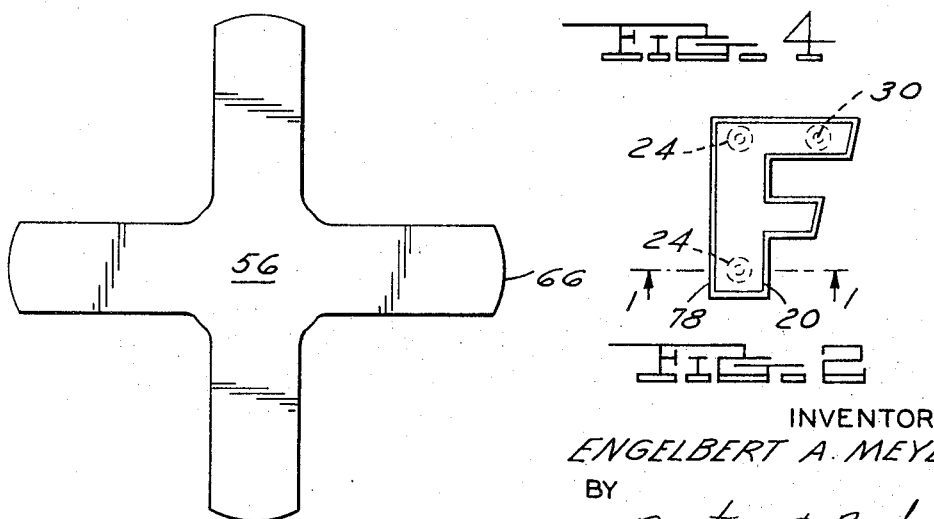
FIG. 5
FIG. 4
FIG. 2
INVENTOR
ENGELBERT A. MEYER
BY
Burton & Parker
ATTORNEYS INVENTOR
ENGELBERT A. MEYER
BY
Burton & Parker
ATTORNEYS

STRUCTURAL ASSEMBLY AND CLIP

FIELD OF INVENTION

This invention relates to fasteners for securing a molding or structural member to a support without perforation of the support and to a molding assembly utilizing such fasteners.

BACKGROUND OF THE INVENTION

In U.S. Pat. No. 3,473,283 I have shown an emblem or the like secured to an automobile body without perforating the body panel, and clip means for effecting such securement. While satisfactory in some instances, such assembly requires three components: a stud, a clip, and the emblem itself. In addition it contemplates an elongated clip which is not always usable where the emblem is quite small. Additionally, adjustment of the clip, and therefore the emblem, relative to the stud was unidirectional and therefore the initial location of the stud on the panel had to be very precise. As a consequence there is a need for an emblem clip, and an emblem assembly (referred to herein as a structural assembly) in which the number of parts are reduced, which will accommodate small inaccuracies in securing the clip to the automobile body panel and which will not be readily knocked off.

SUMMARY OF THE INVENTION

I have shown herein an emblem or the like secured to a panel by but one part and without perforating the panel. The securement is effected by utilizing a clip having a base portion which is welded to the panel and which has integral upstanding arms arranged substantially equidistantly about the base portion and forming an upwardly opening pocket. Each arm includes a resilient flange extending laterally outwardly and downwardly with a biting edge at its distal end. The emblem is provided with an annular recess defining a central boss and the recess is telescoped over the clip with the boss entering the pocket and the flanges flexing inwardly to resiliently bite into the wall of the recess to lock the emblem on the clip and with the central boss entering the pocket and preventing lateral shifting to an extent that will dislodge the biting engagement of the flanges with the recess wall.

BRIEF DESCRIPTION OF THE DRAWINGS:

FIG. 1 is a partial cross-sectional view through a structural assembly embodying the invention, such as taken along a line 1—1 of FIG. 2;

FIG. 2 is a plan view showing an emblem embodying the structural assembly;

FIG. 3 is a side elevation of a preferred clip used in the structural assembly of FIG. 1;

FIG. 4 is a plan view of the clip shown in FIG. 3;

FIG. 5 is a plan view of the blank from which the clip of FIGS. 3 and 4 is formed;

DESCRIPTION OF THE PREFERRED EMBODIMENTS

Figure 6:
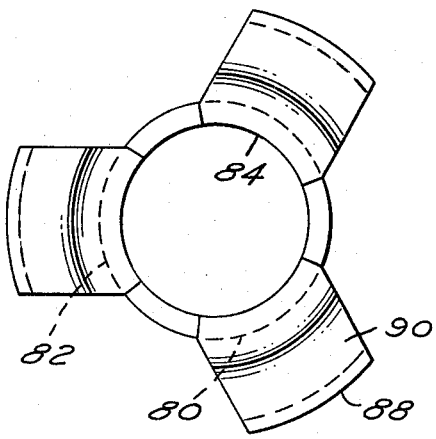
FIG. 6 is a plan view of another form of the clip.

In FIG. 1, I have shown a structural assembly embodying the invention, such as an emblem 20 secured to an automobile body panel 22. A representative emblem is shown in FIG. 2 and may be the letter of a name or other designation which it may be desired to secure to the exterior surface of the automobile body. While I have described the invention in connection with automobile name plates or emblems, it is to be understood that the invention is equally applicable to the appliance field or to any environment where a structural member is to be secured to a support.

As shown in FIGS. 1 and 2, the emblem or structural member 20 includes an annular recess 24 having a central boss 26 terminating short of the bottom face 28 of the emblem. The boss may have a tapered nose 30, and the recess a bevelled entrance 76, facilitating entry of the boss within, and the recess 24 about, the clip 32. The structural member 20 is intended to be secured to the support 22 in anchored stressed relation with the bottom surface 28 held tightly against the opposed surface of the support 22. To this end, the underside of the structural member 20 may be relieved about the recess as at 34, and the structural member itself may be made of a slightly resilient material such as plastic whereby, when the emblem is pushed toward the support 22 in securing the emblem thereto, it can be deflected slightly downwardly in the area of the recess 24 to effect an anchored and tensioned relationship with the support as hereinafter described. Should the emblem 20 not be formed of a slightly resilient material leading to the tensioned anchored relationship above mentioned, the undersurface 28 may have interposed between it and the support 22 a slightly yielding or elastic material (not shown) which will afford the necessary tensioned relationship.

The clip 32 includes a generally planar base portion 36 which is secured to the support 22 without perforation of the support, as by welding or the like 38 which may extend across the interface between the base portion and the surface of the support 22. Integral with and upstanding from the base portion 36 are a plurality of arms which in the case of the embodiment shown in FIGS. 3 and 4, are four in number and are indicated at 40, 42, 44 and 46. The clip of FIGS. 3 and 4 is shown in the structural assembly of FIG. 1 but it is to be understood that the other embodiments of the clip hereinafter described may be substituted for the clip shown in FIG. 1. The clip is formed of a resilient material such as spring steel which may be stainless steel or otherwise as desired. The arms are secured together adjacent the base portion by bridging portions best shown in FIGS. 3 and 4 at 48, 50, 52 and 54, as a result of which the inside of the fastener immediately above the inner surface 56 of the base portion comprises a closed cup. Such cup-like configuration adds strength to the clip structure and tends to rigidify the base area of the clip and lower ends of the arms. The arms in combination define an upwardly opening pocket for receiving the boss 26 as hereinafter described.

Each of the arms is provided with a laterally outwardly and downwardly extending resilient flange, and the flanges are indicated at 58, 60, 62 and 64, and terminate at their distal ends in biting edges 66, 68, 70 and 72. Such biting edges are adapted to bite or dig into the encircling wall 74 of the annular recess in the emblem 20 and lock the emblem on the clip.

The clip may be formed from a blank of sheet metal or the like stamped into the form of a cross as shown in FIG. 5 and then formed into the shape of FIGS. 3 and 4. A suitable automatic welding gun or the like may be provided (not shown) for feeding the clips to a welding electrode on the gun for welding each clip to the automobile panel in the location desired.

The clips may be welded on the support 22 either before or after painting thereof. A sufficient number of clips will be welded to the panel to secure the emblem desired, and for each clip a recess 24 of the characters shown in FIGS. 1 and 2 is provided. With a clip secured to the support 22 as shown in FIG. 1, it is only necessary then to press the emblem down over the clip such that the central boss 26 enters the pocket formed by the upstanding arms 40, 42, 44 and 46 and the bevelled entrance 76 and the wall 74 of the recess will serve to deflect the resilient flanges 58, 60, 62 and 64 laterally inwardly. As the emblem is pushed downwardly over the clip the under surface 28 of the emblem will abut the upper surface of the support 22. Continued downward pressure on the emblem will tend to flex the emblem toward the structural member 22 such that upon discontinuing such pressure the flanges will bite into the encircling wall 74 of the recess and lock the emblem in anchored and stressed relationship on the support. In FIG. 1, which is an enlarged cross-section, the biting edges of the flanges are shown penetrating the encircling wall 74 of the support. The depth of such penetration will be governed by the softness of the material of which the structural member 20 is made.

The boss 26 has a transverse dimension A so related to the distance B between the arms of the clip, and the lateral dimension C across the flanges (when in their inwardly flexed relation) is such in relation to the diameter D of the recess 24, that upon lateral shifting of the structural member 20 relative to the clip, as might be occasioned by a sudden blow against the side of the structural member, the boss 26 will prevent biting edges of the uni-directional from becoming dislodged from the encircling wall 74 of the recess. In other words, should the structural member 20 be shifted toward the right as viewed in FIG. 1 as by a lateral blow against the side 78, the boss 26 will move to the right and engage the inside of the arm 42 and further movement of the structural member will thereupon be prevented. The distance that the boss is permitted to move is less than the amount the encircling wall 74 would have to move away from arm 42 to allow the biting edge 66 to be dislodged from the encircling wall. As a result, the structural member or emblem 20 is retained on the support 22 against dislodgement by violent shaking or accidental lateral blows against the emblem.

If the boss has a diameter dimension A 0.040 inch less than the pocket diameter B of the arms (inside of the pocket), then the clip may be positioned on the support within 0.020 inch of its intended location, i.e., ± 0.020 inch to either side thereof, and the emblem may be properly secured to the support. Such tolerance for mis-positioning of the clip on the panel is multidirectional (through 360°) rather than uni-direction as with the prior art. Thus the structural assembly allows lateral displacement of the emblem relative to the panel either as set forth in the preceding paragraph or to accommodate mispositioning of the clip on the panel.

Figure 7:
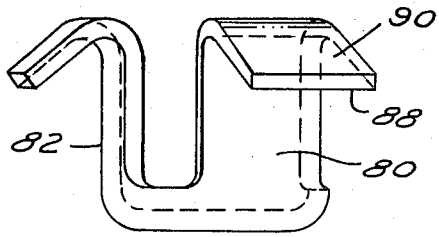
FIG. 7 is a side elevation of the clip shown in FIG. 6.
Figure 8:
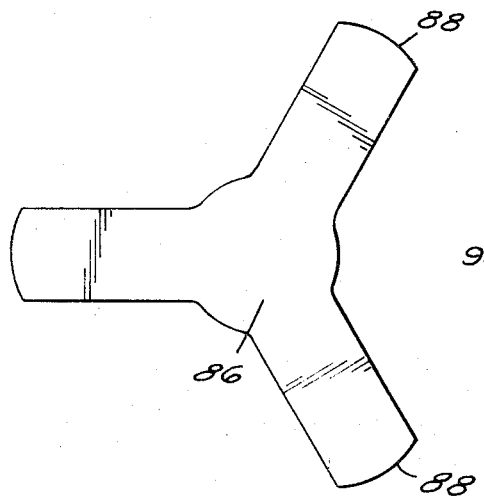
FIG. 8 is a plan view of a blank from which the clip of FIGS. 6 and 7 is formed.

In FIGS. 6 and 7 a clip similar to that shown in FIGS. 3 and 4 is depicted except the clip has only three arms 80, 82 and 84. As with the preceding embodiment, these arms are integral with a base portion 86 and extend upwardly therefrom in equidistantly spaced arrangement to define an upwardly opening pocket into which the boss 26 of the structural member is received to limit lateral shifting of the structural member in the manner previously described. Each of the arms 80, 82 and 84 is provided with a laterally downwardly and outwardly projecting flange each of which is, as in the case of the first described embodiment, provided at its distal end with a biting edge indicated at 88 in the case of flange 90. In FIG. 8, I have shown in plan view the form of blank from which the clip of FIGS. 6 and 7 may be formed.

Figure 9:
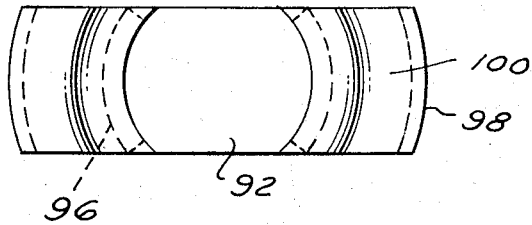
FIG. 9 is a plan view of another form of the clip.
Figure 10:
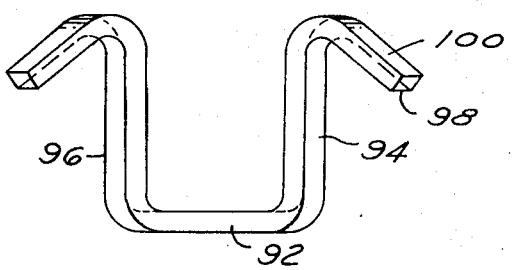
FIG. 10 is a side elevation of the clip shown in FIG. 9.
Figure 11:
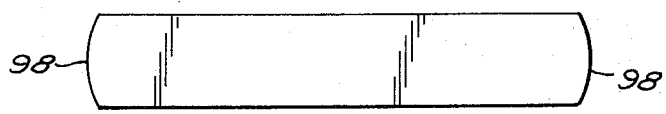
FIG. 11 is a plan view of a blank from which the clip of FIGS. 9 and 10 is formed.

In FIGS. 9 and 10, I have shown still another embodiment of the clip. In this modification the base 92 is provided with but a single pair of upstanding arms 94 and 96 which are arranged in opposition and defined in upwardly opening pocket into which the boss 26 is received for the same purpose described in connection with the first embodiment. Each of the arms 94 and 96 is provided with a laterally outwardly and downwardly extending resilient flange having at its distal end a biting edge as at 98 for the flange 100. In FIG. 11, I have shown a blank from which the clip of FIGS. 9 and 10 may be formed.

It will be noted from an examination of the plan views of the blanks of FIGS. 5, 8 and 11, and from a plan view of the clips shown in FIGS. 4, 6 and 9, that the biting edge may be arcuately shaped as at 102 in FIG. 4. The curve of this arcuate shape substantially matches the curve of the annular wall 74 of the recess in the structural member so that there is full contact across the end of each flange with the wall of the annular recess in the structural member.

While I have described the securement of the clip to the support as being by welding, it is to be understood that adhesive securement is also contemplated. The emblem may be a metal die casting as well as plastic. Reference numeral 104 indicates raised lettering or other treatment on the exposed face of the emblem.

What is claimed is:

1. A structural assembly comprising: a support, a clip having a base directly and rigidly secured to the support without perforation thereof and a plurality of resilient arms integral with the base and extending upwardly therefrom away from the support and arranged substantially equidistantly around the base defining an upwardly opening pocket, each arm having at its upper end a laterally outwardly and downwardly projecting flange whose distal end defines a biting edge, a structural member received on the support over and concealing the clip and having a recess receiving said arms with the wall of the recess engaging the flanges thereof and biasing the arms laterally inwardly to embed the biting edges of the flanges in the wall of the recess locking the structural member on the support, said structural member having a boss portion centered in said recess and extending downwardly into said pocket in normally laterally spaced relation therefrom and having a transverse dimension so related to the transverse dimension of the pocket as to limit lateral displacement between the clip and structural member to substantially within the limits of said inwardly displaced and biased relation of the arms, thereby preventing disengagement of the biting edges from the wall of the recess upon said lateral displacement between the clip and structural member.

2. The invention defined in claim 1 characterized in that said structural member includes a resilient portion engaging the support and tensioning the structural member on the clip upwardly away from the support counter said flanges.

3. The invention defined by claim 1 characterized in that there are a pair of such arms disposed in opposition to each other.

4. The invention defined by claim 1 characterized in that there are three arms.

5. The invention defined by claim 1 characterized in that there are four arms arranged in opposed pairs.

6. The invention defined by claim 1 characterized in that said structural member is resilient and said bottom surface is relieved adjacent said recess and said boss terminates short of the base of the clip, whereby when the structural member is telescoped over the clip and pressed toward the support such member around the recess will flex slightly toward the support to anchor the structural member in stressed relation between said flanges and the support.

* * * * *